US012398640B2

(12) United States Patent
Luo et al.

(10) Patent No.: US 12,398,640 B2
(45) Date of Patent: Aug. 26, 2025

(54) METHOD FOR CALCULATING WELLBORE FRICTION RESISTANCE OF FOAM DRAINAGE GAS PRODUCTION WELL

(71) Applicant: Southwest Petroleum University, Chengdu (CN)

(72) Inventors: Chengcheng Luo, Chengdu (CN); Pengbo Wu, Chengdu (CN); Yonghui Liu, Chengdu (CN); Yu Shi, Chengdu (CN); Yang Liu, Chengdu (CN); Haibin Cai, Chengdu (CN); Jianying Yang, Chengdu (CN); Ziyan Wang, Chengdu (CN); Zhenghao Zhang, Chengdu (CN)

( * ) Notice: Subject to any disclaimer, the term of this patent is extended or adjusted under 35 U.S.C. 154(b) by 0 days.

(21) Appl. No.: 18/972,841

(22) Filed: Dec. 7, 2024

(65) Prior Publication Data

US 2025/0101866 A1    Mar. 27, 2025

(30) Foreign Application Priority Data

Dec. 12, 2023   (CN) .......................... 202311698336.5

(51) Int. Cl.
*E21B 49/08*   (2006.01)
*E21B 47/06*   (2012.01)

(52) U.S. Cl.
CPC .......... *E21B 49/0875* (2020.05); *E21B 47/06* (2013.01)

(58) Field of Classification Search
CPC .............................. E21B 49/0875; E21B 47/06
See application file for complete search history.

(56) References Cited

FOREIGN PATENT DOCUMENTS

| CN | 114862029 A | * | 8/2022 | ............ G06F 30/10 |
| CN | 112347601 B | * | 10/2022 | ............ E21B 43/16 |
| CN | 115221666 A | * | 10/2022 | |
| CN | 115370358 A | * | 11/2022 | |

(Continued)

OTHER PUBLICATIONS

C. Kanin et al, "A Predictive Model for Steady-State Multiphase Pipe Flow: Machine Learning on Lab Data", Journal of Petroleum Science and Engineering, 180, (2019) 727-746. (Year: 2019).*

(Continued)

*Primary Examiner* — Eman A Alkafawi
*Assistant Examiner* — Dilara Sultana
(74) *Attorney, Agent, or Firm* — Addison D. Ault; IPGentleman Intellectual Property Services, LLC

(57) ABSTRACT

The present disclosure provides a method for calculating wellbore friction resistance of a foam drainage gas production well. It is based on the conversion of the parameters of the gas-liquid two-phase flow Mukherjee & Brill model, it defines the liquid film reversal point as the zero friction resistance point, ignores the influence of the negative value of friction resistance, and uses this as a starting point to predict the change of friction resistance. The influence of liquid phase parameters and foaming agent concentration is taken into account in the friction resistance coefficient. An effective calculation method is obtained by combining the experimental data fitting and optimization. The present disclosure better characterizes the wellbore flow condition of the foam drainage gas production well, and provides important theoretical support for the prediction of the wellbore pressure drop of the foam drainage gas production well.

1 Claim, 2 Drawing Sheets

(56) References Cited

FOREIGN PATENT DOCUMENTS

| | | | |
|---|---|---|---|
| CN | 115708102 A | * | 2/2023 |
| CN | 117669420 A | | 3/2024 |

OTHER PUBLICATIONS

CNIPA; Application No. 202311698336.5, first Office Action, original Chinese, dated May 1, 2024, pp. 1-4.
CNIPA; Application No. 202311698336.5, first Office Action dated May 1, 2024, English translation accessed Dec. 6, 2024, pp. 1-5.
CNIPA; Application No. 202311698336.5, Notice of Allowability, original Chinese, dated Aug. 22, 2024, 1 page.
CNIPA; Application No. 202311698336.5, Notice of Allowability dated Aug. 22, 2024, English translation accessed Dec. 6, 2024, pp. 1-2.

* cited by examiner

METHOD FOR CALCULATING WELLBORE FRICTION RESISTANCE OF FOAM DRAINAGE GAS PRODUCTION WELL

CROSS-REFERENCE TO RELATED APPLICATION

This application claims priority to Chinese Patent Application No. 202311698336.5, filed on Dec. 12, 2023 before the China National Intellectual Property Administration, the disclosure of which is incorporated herein by reference in entirety.

TECHNICAL FIELD

The present disclosure relates to the field of water drainage and gas production of gas reservoir, and in particular to a method for calculating wellbore friction resistance of a foam drainage gas production well.

BACKGROUND

The gas well enters a low-pressure and low-production stage in the late stage of production. The low gas production is not enough to ensure the continuous liquid carrying of the gas well, it is easy to cause water block and shutdown. In order to effectively prevent and delay the phenomenon of gas well liquid accumulation, the gas field widely uses low-cost, fast-acting and easy-to-operate foam drainage gas production technology to reduce the critical liquid-carrying gas volume. The foam drainage gas production process is a drainage measure that uses a foaming agent to mix with the gas and liquid in the wellbore to form foam, thereby inhibiting the liquid from sliding down during the flow of the wellbore fluid, changing the flow pattern, and reducing the bottom hole back pressure.

In the production process of gas well, accurately predicting the flow pressure drop of the mixed fluid in the wellbore the wellbore is crucial to the dynamic optimization of the process parameters of the foam drainage gas production well. In the field of multiphase flow research, the wellbore pressure drop model mainly consists of two parts: gravity pressure drop and friction resistance pressure drop. For foam fluid, the calculation of the friction resistance between the fluid and the pipe wall is extremely complex and particularly important.

In the two-phase flow pressure drop model commonly used in engineering, the calculation of friction resistance pressure drop is mainly to determine the two-phase flow friction resistance coefficient $f_m$ using the Jain formula. However, since the liquid phase in the wellbore fluid of the foam drainage gas production well is a mixed phase of foam and water, the conventional two-phase friction resistance coefficient calculation method is difficult to accurately characterize the wellbore friction resistance of the foam drainage gas production well. Moreover, in the existing research of wellbore pressure drop prediction model of the foam drainage gas production well, the assumption that the foam stably fills the wellbore and the use of the two-phase friction resistance coefficient are inconsistent with the actual wellbore flow conditions. In addition, there are almost no relevant reports on the calculation of the wellbore friction resistance of the foam drainage gas production well.

The present disclosure provides a method for calculating the wellbore friction resistance of the foam drainage gas production well, which is based on the two-phase flow Mukherjee & Brill model. The method considers the influence of liquid phase parameters in the friction resistance coefficient, takes the zero friction resistance point of the multiphase pipe flow experiment as a reference, introduces the foaming agent concentration parameter, calculates gas flow velocity at the zero friction resistance point under the foam drainage gas production condition, obtains polynomial coefficients through experimental fitting, and then forms a new calculation method for the wellbore friction resistance of the foam drainage gas production well, and provides important theoretical support for the prediction of the wellbore pressure drop of the foam drainage gas production well.

SUMMARY

The purpose of the present disclosure is to solve the problems that the calculation method of the wellbore friction resistance of the foam drainage gas production well is lacking, and thus the wellbore pressure drop of the foam drainage gas production well cannot be effectively predicted and the process parameters cannot be optimized. A method for calculating wellbore friction resistance of a foam drainage gas production well is provided to provide important theoretical support for the optimization design of the foam drainage gas production process.

The method for calculating the wellbore friction resistance of the foam drainage gas production well described in the present disclosure mainly includes the following steps:

Step 1: collecting dynamic production parameters of the gas production well in a target research area, determining pressure, temperature, gas production rate, liquid production rate of the gas production well, and type, factory parameters and usage concentration of a foaming agent, and calculating fluid density, apparent velocities and foaming agent concentration coefficient of a wellbore of the gas production well. The corresponding calculation formula is as follows:

(1.1) Calculation formula of gas density ($\rho_G$) under different pressure conditions:

$$\rho_G = \frac{pM}{ZRT},$$

where $\rho_G$ is gas density (kg/m³), p is pressure (MPa), M is relative molecular mass of natural gas (g/mol), T is temperature (K), R is ideal gas constant (0.008314 atm·m³/(kmol·K)), Z is deviation factor, dimensionless;

(1.2) Calculation of apparent velocity of the fluid in the wellbore of the gas production well: the calculation formula of gas phase apparent velocity ($v_{SG}$)

$$v_{SG} = \frac{Q_{SC}\rho_{SC}}{\rho_G A},$$

the calculation formula of liquid phase apparent velocity ($v_{SL}$) is $$v_{SL} = \frac{Q_{SL}}{A},$$

the calculation formula of gas-liquid mixed fluid velocity ($v_m$) is $v_m = v_{SL} + v_{SG}$, where $v_{SG}$, $v_{SL}$ and $v_m$ are gas phase apparent velocity, liquid phase apparent velocity and gas-liquid mixed phase apparent velocity (m/s), respectively, $Q_{SC}$ and $Q_{SL}$ are gas production rate and liquid production rate of the gas production well (m³/d), respectively, $\rho_{SC}$ is atmospheric pressure gas density (kg/m³), A is the cross-sectional area of the pipeline (m²);

(1.3) The calculation formula of the foaming agent concentration coefficient ($\chi$) is:

$$\chi = \frac{C_v}{CMC},$$

where $\chi$ is the foaming agent concentration coefficient defined in the present disclosure, $C_v$ is foaming agent concentration (mg/L), and CMC is foaming agent critical micelle concentration (mg/L).

Step 2: calculating a critical gas velocity $v_{cf}$ of gas-liquid two-phase liquid film reversal, m/s;

$$v_{cf} = \left\{ c_1 \left[ \frac{gD(\rho_L - \rho_G)}{\rho_G} \right]^{0.25} + c_2 (\rho_L \rho_G v_{SL}^2)^{0.25} \right\}^2$$

wherein $v_{cf}$ is the critical gas velocity of the gas-liquid two-phase liquid film reversal (m/s), $c_1$, $c_2$ represent coefficients of a polynomial obtained by experimental fitting, g is acceleration of gravity (m/s²), D is inner diameter of an oil pipe (m), $\rho_L$ is liquid phase density (kg/m³).

Step 3: by analogy with the gas-liquid two-phase liquid film reversal point in the Step 2, determining the foam film reversal point under the flow condition of the wellbore of the foam drainage gas production well. The corresponding critical gas velocity of foam film reversal is $v_{cfoam}$. The zero friction resistance point gas velocity ratio is defined as a ratio of the gas velocity at the zero friction resistance point under the foam drainage gas production process condition to the gas velocity at the zero friction resistance point under the gas-water two-phase flow condition, expressed as $v_{cfoam}/v_{cf}$.

Step 4: based on a gas-liquid two-phase friction resistance coefficient, in consideration of the influence of liquid phase velocity and foaming agent concentration, proposing a new calculation expression of a friction resistance coefficient under the foam drainage gas production process condition: $f_{m\text{-}foam} = (a_1 f_m + a_2 \ln v_{SL} + a_3 \chi + a_4)$, where $f_{m\text{-}foam}$ is wellbore friction resistance coefficient under the foam drainage gas production process condition, $f_m$ is gas-liquid two-phase friction resistance coefficient in a Mukherjee & Brill model, and $a_1$, $a_2$, $a_3$, $a_4$ represent the coefficients of the polynomial obtained by experimental fitting.

Step 5: by using newly proposed relational expression of the gas velocity ratio at the zero friction resistance point and the foaming agent concentration coefficient, in combination with calculation formula of the critical gas velocity ($v_{cf}$) of the gas-liquid two-phase liquid film reversal obtained in the Step 2, calculating the critical gas velocity $v_{cfoam}$ of the foam film reversal. The calculation formula is $$\frac{v_{cfoam}}{v_{cf}} = \left( b_1 + \frac{b_2}{\chi + 1} + \frac{b_3}{(\chi + 1)^2} \right),$$

where $v_{cfoam}$ is the critical gas velocity of the foam film reversal, $b_1$, $b_2$, $b_3$ represent the coefficients of the polynomial obtained by experimental fitting.

Step 6: in view of the calculation formula for the wellbore friction resistance coefficient ($f_{m\text{-}foam}$) under the foam drainage gas production process condition in the Step 4 and the calculation formula the critical gas velocity ($v_{cfoam}$) of the foam film reversal in the Step 5, and by optimization and fitting of physical simulation experimental data, obtaining a calculation formula for the wellbore friction resistance of the foam drainage gas production well:

$$-\frac{dp}{dz}\bigg|_f = (a_1 f_m + a_2 \ln v_{SL} + a_3 \chi + a_4) \frac{\rho_{ns}(v_m - v_{cfoam})^2}{2D},$$

wherein $\rho_{ns}$ is density of non-slip mixed fluid (kg/m³), $\rho_m = \rho_L \lambda_L + \rho_G(1-\lambda_L)$, $\lambda_L$ is non-slip liquid holding rate, $\lambda_L = v_{SL}/v_m$.

DETAILED DESCRIPTION OF EMBODIMENTS

In order to make the purpose, technical scheme and advantages of the present disclosure more clear, the present disclosure is further described in detail in conjunction with the accompanying drawings.

Figure 1:
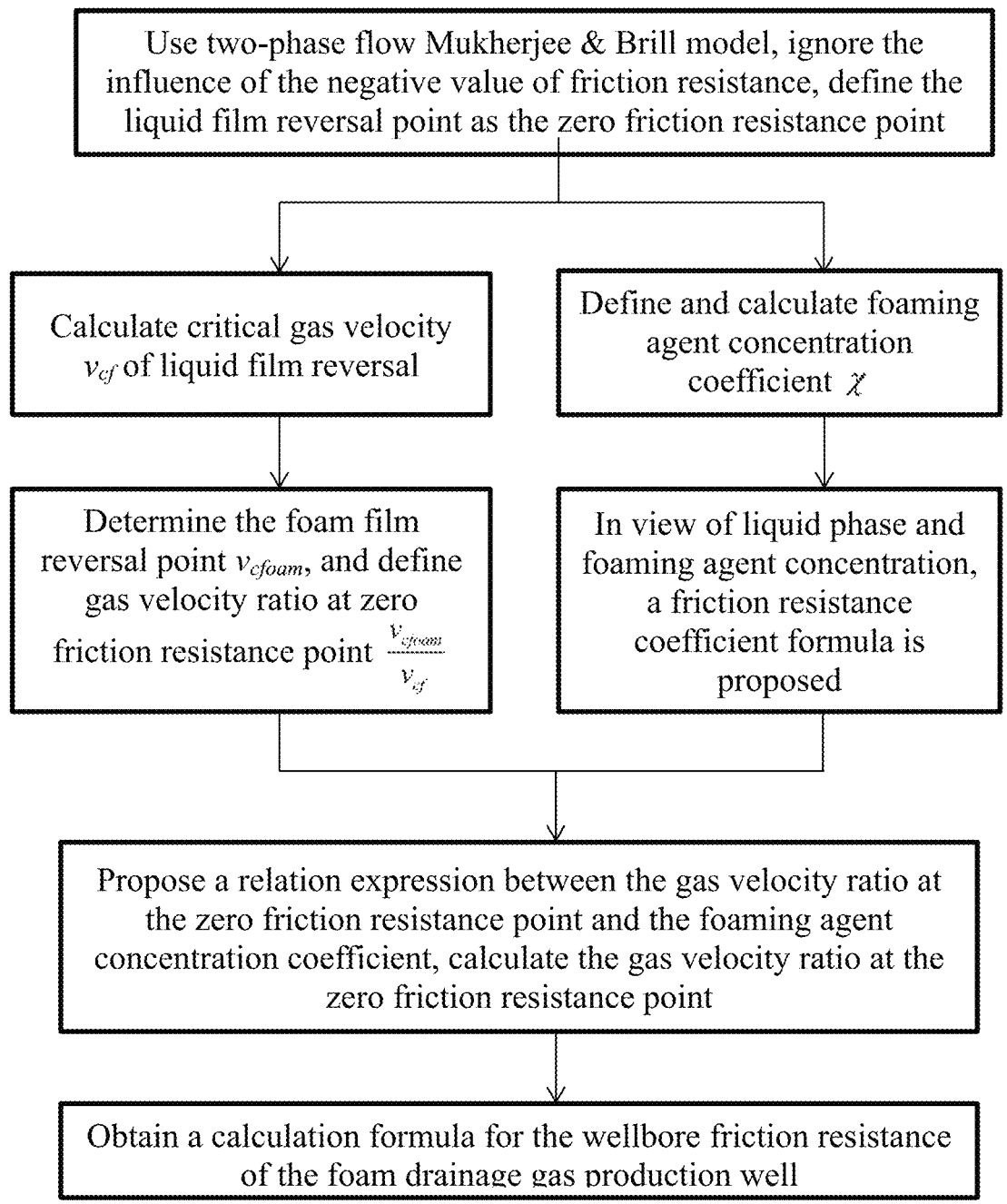
FIG. 1 is a technical roadmap of the present disclosure.

As shown in FIG. 1, FIG. 1 is a technical roadmap of the present disclosure. The present disclosure provides a method for calculating a wellbore friction resistance of a foam drainage gas production well, which is mainly based on the conversion of the friction resistance calculation equation of the two-phase flow Mukherjee & Brill model. The key point is to define the liquid film reversal point as the zero friction resistance point, ignore the influence of the negative value of the friction resistance, and use this as the starting point to predict the change of the friction resistance, and then propose a calculation formula for the wellbore friction resistance of the foam drainage gas production well:

$$-\frac{dp}{dz}\bigg|_f = f_{m\text{-}foam} \frac{\rho_{ns}(v_m - v_{cfoam})^2}{2D}.$$

The core of the calculation method provided by the present disclosure is to calculate the friction resistance coefficient $f_{m\text{-}foam}$ under the foam drainage gas production process condition and the gas velocity $v_{cfoam}$ at the zero friction resistance point of the foam drainage gas production well.

(1) Calculation of the friction resistance coefficient $f_{m\text{-}foam}$ under the foam drainage gas production process condition. Taking the friction resistance coefficient $f_m$ in the two-phase flow Mukherjee & Brill model as the prototype, under the foam drainage gas production process condition, considering the influence of the liquid phase velocity and the concentration of the foaming agent, the calculation formula in Step 4 is proposed: $f_{m\text{-}foam} = (a_1 f_m + a_2 \ln v_{SL} + a_3 \chi + a_4)$.

(2) Calculation of the gas velocity $v_{cfoam}$ of the foam drainage gas production well at the zero friction resistance point. The critical gas velocity $v_{cf}$ of the gas-liquid two-phase liquid film reversal is calculated according to the formula provided in Step 2. Define the gas velocity ratio at the zero friction resistance point, and solve the relation expression $$\frac{v_{cfoam}}{v_{cf}} = \left(b_1 + \frac{b_2}{\chi+1} + \frac{b_3}{(\chi+1)^2}\right)$$

between the gas velocity ratio at the zero friction resistance point and the foaming agent concentration coefficient proposed in Step 5.

Finally, a new friction resistance calculation formula for foam drainage gas production well is obtained through optimization and fitting of physically simulated experimental data:

$$-\frac{dp}{dz}\bigg|_f = (a_1 f_m + a_2 \ln v_{SL} + a_3 \chi + a_4)\frac{\rho_{ns}(v_m - v_{cfoam})^2}{2D}.$$

Figure 2:
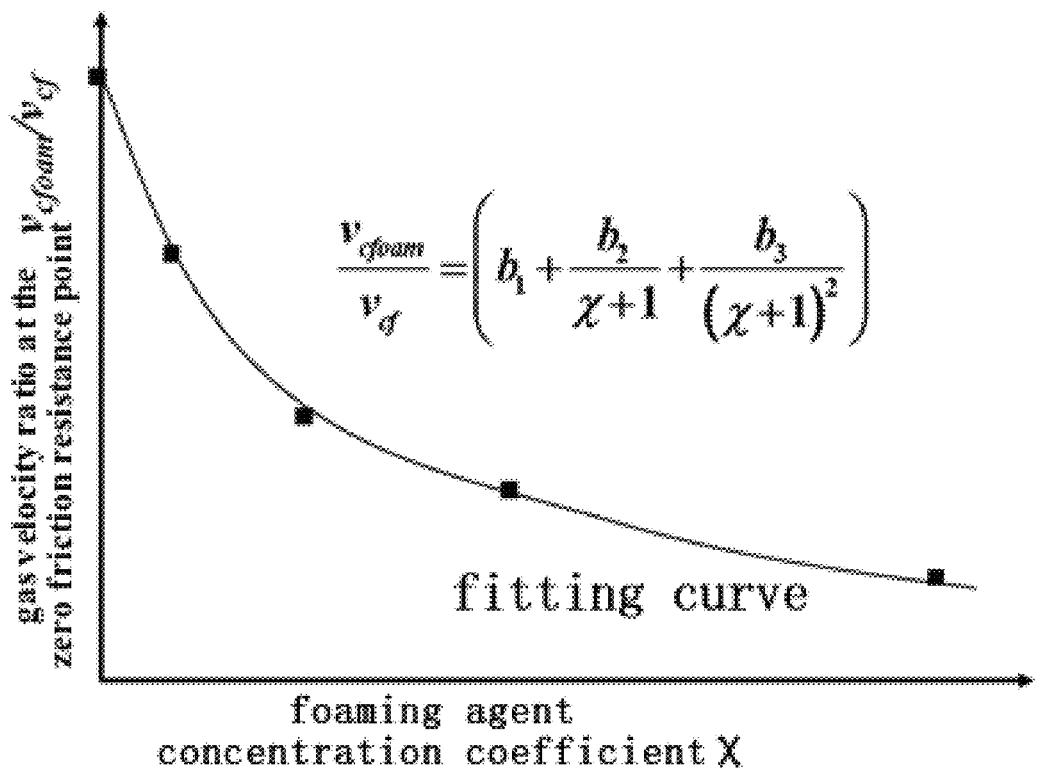
FIG. 2 is a schematic diagram of the relationship between the airflow velocity ratio at the zero friction resistance point and the foaming agent concentration coefficient.

As shown in FIG. 2, FIG. 2 is a schematic diagram of the relationship between the airflow velocity ratio at the zero friction resistance point and the foaming agent concentration coefficient. The relationship between the airflow velocity ratio at the zero friction resistance point and the foaming agent concentration coefficient is the key path for calculating the gas velocity at the zero friction resistance point of the foam drainage gas production well. Considering the influence of the gas-liquid two-phase gas velocity at the zero friction resistance point and the foaming agent, the functional relationship between the gas velocity ratio at the zero friction resistance point and the foaming agent concentration coefficient is found through physical simulation experiments, and then the gas velocity $v_{cfoam}$ at the zero friction resistance point of the foam drainage gas production well is calculated.

Compared with the shortcomings and deficiencies of the prior art, the present disclosure has the following beneficial effects:

(1) Under the condition of foam drainage gas production process, the wellbore friction resistance coefficient formula of the foam drainage gas production well is proposed by fully considering the influence of liquid phase flow velocity and foaming agent concentration.

(2) The relationship between the gas velocity ratio at the zero friction resistance point and the foaming agent concentration coefficient newly proposed by the present disclosure is used to calculate the gas flow velocity at the zero friction resistance point of the foam drainage gas production well.

(3) The key calculation parameters of the present disclosure, the friction resistance coefficient and the gas flow velocity at the zero friction resistance point of the foam drainage gas production well, are both related to the foaming agent concentration to better characterize the flow condition of the wellbore of the foam drainage gas production well.

Additionally disclosed are systems and methods comprising implementation of methods of calculating a wellbore friction resistance of a foam drainage gas production well using computers and processors comprising non-transient memory units, and/or equipped with programmable storage capable of implementing the disclosed methods.

Methods of calculating a wellbore friction resistance of a foam drainage gas production well may be applied in planning, designing, building, maintaining and/or managing gas production wells, wherein the method of calculating a wellbore friction resistance of a foam drainage gas production well is utilized to determine productive capacity, increase productive capacity, extend well lifespan and/or manage well production. For example, the disclosed method may be used to increase the longevity of a well in conjunction with a foam drainage gas production process for reducing the critical liquid-carrying gas volume in wells with low gas pressure. In turn, by extending the longevity of wells, the disclosed method may be used to plan drilling, maintenance or management of additional gas wells in a given area.

Obviously, the above description is only the implementation idea of the present disclosure and is not intended to limit the present disclosure. Any modifications, equivalent substitutions and improvements made within the spirit and principle of the present disclosure should be included in the protection scope of the present disclosure.

What is claimed is:

1. A method of increasing the production of a gas well in conjunction with a foam drainage gas production process, wherein the method comprises calculating wellbore friction resistance of a foam drainage gas production well;

wherein calculating wellbore friction resistance of a foam drainage gas production well comprises:

Step 1: collecting dynamic production parameters of the gas production well in a target research area, determining pressure, temperature, gas production rate, liquid production rate of the gas production well, and type, factory parameters and usage concentration of a foaming agent, and calculating fluid density, gas phase apparent velocity, liquid phase apparent velocity and foaming agent concentration coefficient of a wellbore of the gas production well;

wherein, the fluid density of the wellbore is $$\rho_G = \frac{pM}{ZRT},$$

$\rho_G$ is gas density, kg/m$^3$, p is pressure, MPa, M is relative molecular mass of natural gas, g/mol, T is temperature, K, R is ideal gas constant, Z is deviation factor, dimensionless; the gas phase apparent velocity is $$v_{SG} = \frac{Q_{SC}\rho_{SC}}{\rho_G A},$$

the liquid phase apparent velocity is $$v_{SL} = \frac{Q_{SL}}{A},$$

$Q_{Sc}$, $Q_{SL}$ are gas production rate and liquid production rate of the gas production well, m$^3$/d, $\rho_{SC}$ is atmospheric pressure gas density, kg/m$^3$, A is pipeline cross-sectional area, m$^2$; the foaming agent concentration coefficient $\chi$ is $\chi$=Cv/CMC, $C_v$ is foaming agent concentration, mg/L, CMC is foaming agent critical micelle concentration, mg/L;

Step 2: calculating a critical gas velocity $v_{cf}$ of gas-liquid two-phase liquid film reversal, m/s;

$$v_{cf} = \left\{c_1\left[\frac{gD(\rho_L - \rho_G)}{\rho_G}\right]^{0.25} + c_2(\rho_L \rho_G v_{SL}^2)^{0.25}\right\}^2$$

wherein $c_1$, $c_2$ represent coefficients of a polynomial obtained by experimental fitting, g is acceleration of gravity, m/s², D is inner diameter of an oil pipe, m, $\rho_L$ is liquid phase density, kg/m³;

Step 3: by analogy with the critical gas velocity $v_{cf}$ of gas-liquid two-phase liquid film reversal in the step 2, determining a critical gas velocity $v_{cfoam}$ of foam film reversal under a flow condition of the wellbore of the foam drainage gas production well, and defining a gas velocity ratio $v_{cfoam}/v_{cf}$ at a zero friction resistance point, which is a ratio of a gas velocity at the zero friction resistance point under a foam drainage gas production process condition to a gas velocity at the zero friction resistance point under a gas-liquid two-phase flow condition;

Step 4: based on a gas-liquid two-phase friction resistance coefficient, in consideration of the influence of liquid phase velocity and foaming agent concentration, proposing a calculation expression of a friction resistance coefficient under the foam drainage gas production process condition: $f_{m\text{-}foam}=(a_1 f_m + a_2 \ln v_{SL} + a_3 \chi + a_4)$, where $f_{m\text{-}foam}$ is wellbore friction resistance coefficient under the foam drainage gas production process condition, $f_m$ is friction resistance coefficient in a Mukherjee & Brill model, $\chi$ is the foaming agent concentration coefficient, and $a_1$, $a_2$, $a_3$, $a_4$ represent the coefficients of the polynomial obtained by experimental fitting;

Step 5: by using a relational expression of the gas velocity ratio $$\frac{v_{cfoam}}{v_{cf}} = \left(b_1 + \frac{b_2}{\chi+1} + \frac{b_3}{(\chi+1)^2}\right)$$

at the zero friction resistance point and the foaming agent concentration coefficient $\chi$, in combination with calculation formula of the critical gas velocity $v_{cf}$ of the gas-liquid two-phase liquid film reversal obtained in the Step 2, calculating the critical gas velocity $v_{cfoam}$ of the foam film reversal, where $b_1$, $b_2$, $b_3$ represent the coefficients of the polynomial obtained by experimental fitting;

Step 6: defining the liquid film reversal point as the zero friction resistance point, ignoring the influence of a negative value of the friction resistance, and using it as a starting point to predict the change of friction resistance, and then proposing a calculation formula for the wellbore friction resistance of the foam drainage gas production well:

$$-\frac{dp}{dz}\bigg|_f = f_{m\text{-}foam}\frac{\rho_{ns}(v_m - v_{cfoam})^2}{2D},$$

where $\rho_{ns}$ is density of non-slip mixed fluid, kg/m³, $\rho_{ns}=\rho_L\lambda_L+\rho_G(1-\lambda_L)$, $\lambda_L$ is non-slip liquid holding rate, $\lambda_L=v_{SL}/v_m$, $v_m$ is apparent velocity of a gas-liquid mixed fluid, $v_m=v_{SL}+v_{SG}$; in view of the calculation expression of the friction resistance coefficient under the foam drainage gas production process condition in the Step 4 and the $v_{cfoam}$ obtained in the Step 5, by optimization and fitting of physical simulation experimental data, obtaining a final calculation formula for the friction resistance of the foam drainage gas production well:

$$-\frac{dp}{dz}\bigg|_f = (a_1 f_m + a_2 \ln v_{SL} + a_3\chi + a_4)\frac{\rho_{ns}(v_m - v_{cfoam})^2}{2D};$$

wherein the method of increasing the production of a gas well in conjunction with a foam drainage gas production process further comprises optimizing a liquid-carrying gas volume according to the wellbore friction resistance of the foam drainage gas production well, thus increasing the production of the foam drainage gas production well by increasing the longevity of the gas production well.

* * * * *